United States Patent Office 3,452,271
Patented June 24, 1969

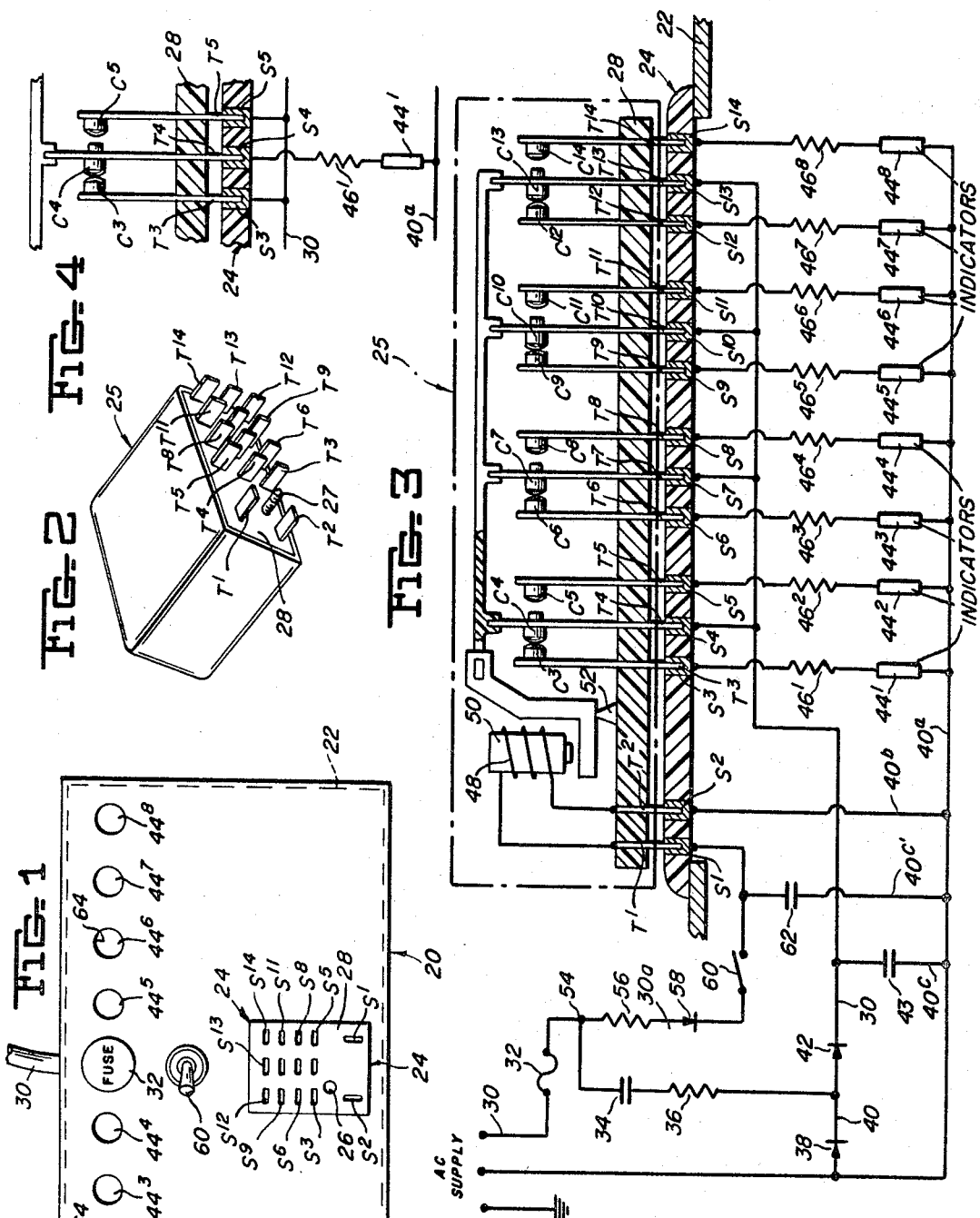
INVENTOR
PAUL L. KETTER
By Donald G. Dalton
Attorney

3,452,271
APPARATUS FOR TESTING RELAYS FOR OPERABILITY, CONTINUITY AND LEAKAGE
Paul L. Ketter, Elizabeth, Pa., assignor to United States Steel Corporation, a corporation of Delaware
Filed Jan. 17, 1967, Ser. No. 609,879
Int. Cl. G01r 31/02, 31/12
U.S. Cl. 324—28          7 Claims

ABSTRACT OF THE DISCLOSURE

This invention relates to testing apparatus, and more particularly to an improved relay testing apparatus for testing electrical continuity of the relay coil, operation of the relay armature, leakage through the relay contacts and continuity through the relay contacts. The improved apparatus is for testing a relay having a contact pile including a first stationary contact, a second stationary contact, a movable contact normally engageable with the first stationary contact and insulation between the first stationary contact, the second stationary contact and the movable contact. This apparatus comprises power means adapted to provide a first predetermined voltage; a storage capacitor connected to the power means; charging means connected to the power means and the storage capacitor for charging the storage capacitor to a second predetermined voltage. One of the movable contact and the second stationary contact is connected to the charged storage capacitor and the power means. A first signal means is connected to the other of the movable contact and the second stationary contact and to the power means so that when the first predetermined voltage and the second predetermined voltage are additively applied across the insulation between the movable contact and the second stationary contact energization of the first signal means will indicate leakage across the insulation and across the normally open contacts of the relay. The relay also has a coil and an armature operable by the coil to move the movable contact into engagement with the second stationary contact. The coil is connected to the power means; and switch means is in series with the power means and the coil and is operable to energize the coil, actuate the armature and move the movable contact into engagement with the second stationary contact so that energization of the first signal means will indicate electrical continuity of the coil and operation of the armature.

BACKGROUND OF THE INVENTION

In a monitoring system, such as a reversal monitoring system for a production apparatus, for example coke oven batteries, the necessary telemetering equipment for measuring quantities, such as heating reversals, gas pressures, stack draft pressures and the like and for transmitting such measured quantities from the battery revising rooms to a central location where such measured quantities are indicated and/or recorded, about 400 relays are employed. Heretofore in order to detect a defective relay it was necessary to replace an entire group of such relays, which method of detection was costly, time consuming and often inconclusive.

OBJECTS OF THE INVENTION

It is the general object of the present invention to avoid and overcome the foregoing and other difficulties of and objections to prior art practices by the provision of a relay testing apparatus which quickly, cheaply and conclusively tests:

(a) Electrical continuity of the relay coil;
(b) Operation of the relay armature;
(c) Leakage through any of the normally open contacts of the relay when the normally open contacts are in the open position;
(d) Leakage through any of the normally closed contacts of the relay when such normally closed contacts are in the open position;
(e) Electrical continuity through the normally closed contacts of the relay when the normally closed contacts are in the closed position; and
(f) Electrical continuity through the normally open contacts of the relay when such normally open contacts are in the closed position.

BRIEF SUMMARY OF THE INVENTION

The aforesaid objects of the present invention and other objects which will become apparent as the description procedes, are achieved by providing an improved apparatus for testing a relay having a contact pile including a first stationary contact, a second stationary contact, a movable contact normally engageable with the first stationary contact and insulation between the first stationary contact, the second stationary contact and the movable contact. This apparatus comprises a power means adapted to provide a first predetermined voltage, a storage capacitor connected to the power means, and a charging means connected to the power means and the storage capacitor for charging the storage capacitor to a second predetermined voltage. One of the movable contact and the second stationary contact are connected to the charged storage capacitor and the power means. A first signal means is connected to the other of the movable contact and the second stationary contact and to the power means so that when the first predetermined voltage and the second predetermined voltage are additively applied across the insulation between the movable contact and the second stationary contact, energization of the first signal means will indicate leakage across the insulation and across the normally open contacts of the relay. The relay also has a coil and an armature operable by the coil to move the movable contact into engagement with the second stationary contact. The coil is connected to the power means; and switch means is in series with the power means and the coil and is operable to energize the coil, actuate the armature and move the movable contact into engagement with the second stationary contact so that energization of the first signal means will indicate electrical continuity of the coil and operation of the armature.

For a better understanding of the present invention reference should be had to the accompanying drawings wherein like numerals of reference indicate similar parts throughout the several views and wherein:

BRIEF DESCRIPTION OF THE SEVERAL VIEWS OF THE DRAWINGS

FIGURE 1 is a plan view of the apparatus of the present invention and omitting from its socket the relay being tested;

FIGURE 2 is a perspective view of the relay being tested;

FIGURE 3 is a wiring diagram of the testing apparatus and showing the relay being tested in the socket of the testing apparatus and the power lead of the voltage multiplying circuit connected to the movable contact of the relay; and FIGURE 4 is a fragmentary portion of a wiring diagram similar to FIGURE 2 of an alternative embodiment showing the voltage multiplying circuit connected to the stationary contacts of the relay.

Although the principles of the present invention are broadly applicable for apparatus for testing relays, the present invention is particularly adapted for use in conjunction with a relay operable on direct current and hence is so illustrated and will be so described.

DETAILED DESCRIPTION

With specific reference to the form of the present invention illustrated in the drawings, and referring particularly to FIGURE 1, a testing apparatus of the present invention is indicated generally by the reference numeral 20.

This testing apparatus 20 is provided with a frame 22 (FIGURE 1) in which is mounted a relay socket 24 (FIGURES 1, 3, 4). As shown in FIGURE 1, the socket 24 is provided with a plurality of socket terminals numbered $S^3$ through $S^{14}$, a plurality of coil terminals $S^1$ and $S^2$ and an aperture 26 adapted to receive a threaded alignment and locking stud 27 (FIGURE 2) on the bottom of a relay 25 (FIGURES 2, 3) to be tested, thereby permitting securement of said relay 25 in the socket 24.

Referring now to FIGURE 3, the relay 25 has a contact pile including a plurality of first stationary contacts $C^3$, $C^6$, $C^9$, $C^{12}$, a plurality of second stationary contacts $C^5$, $C^8$, $C^{11}$, $C^{14}$, a plurality of movable contacts $C^4$, $C^7$, $C^{10}$, $C^{13}$, each normally engageable with a corresponding first stationary contact (i.e. $C^4$ with $C^3$, $C^7$ with $C^6$, $C^{10}$ with $C^9$ and $C^{13}$ with $C^{12}$) and insulation 28 (FIGURES 1-4), such as Micarta, a trade name for a laminated insulation material manufactured by the Westinghouse Electric Corporation, Pittsburgh, Pa., disposed respectively between each set of the first stationary contacts $C^3$ etc., the movable contacts $C^4$ etc. and the second stationary contacts $C^5$ etc., such as, for example, each set of contacts $C^3$, $C^4$ and $C^5$ etc. The terminal portions $T^1$ through $T^{14}$ of these contacts $C^1$ through $C^{14}$ are received respectively in the corresponding socket terminals $S^1$ through $S^{14}$. Since each set of contacts $C^3$, $C^4$, $C^5$, etc. is similar, the operation of the testing apparatus 20 will be described with respect to the set of contacts $C^3$, $C^4$ and $C^5$.

For purposes of illustration the relay 25 may have a contact rating of about 2 amperes and about 29 volts D–C and a coil rating of about 24 volts D–C with a coil resistance of about 700 ohms or, for example, a contact rating of about 2 amperes and about 48 volts D–C with a coil rating of about 28 volts D–C and a coil resistance of about 2500 ohms.

*Leakage across the normally open contacts of the relay*

As shown in FIGURE 3, the test apparatus 20 is provided with a suitable power means adapted to provide a first predetermined voltage, such as about 120 volts A–C and 20 to 60 cycles and is indicated in FIGURE 3 by the legend "A–C supply." When this voltage is rectified on the positive half cycle of the alternating current (as hereinafter explained), a first predetermined voltage, such as about 165 volts D–C, is provided by the power means.

A power line 30 (FIGURES 1, 3) of the A–C voltage supply extends through a fuse 32 to a storage capacitor or condenser, such as a charging condenser 34, and to a charging means, such as the resistor 36 and a first rectifier 38 disposed in a return line 40 of the A–C power supply. The first rectifier 38 and current limiting resistor 36 charge the storage condenser 34 to a second predetermined voltage, such as about 165 volts D–C, during the negative phase of the A–C voltage supply. During the positive phase of each cycle of the A–C voltage supply the A–C voltage provided by the A–C voltage supply is added to the second predetermined voltage on the charging condenser 34 and fed to a second rectifier 42 in the power line 30, which power line 30 is connected to one of, for example, the movable contact $C^4$ and the second stationary contact $C^5$, in this case, as shown in FIGURE 3, to the movable contact $C^4$ at the socket terminal $S^4$.

A first signal means, such as an indicator or a neon light $44^2$, is connected through a resistor $46^2$ to the other of the movable contact $C^4$ and the second stationary contact $C^5$, in this case to the second stationary contact $C^5$, so that when the first predetermined voltage of about 165 volts D–C from the A–C voltage supply and the second predetermined voltage of about 165 volts D–C from the charging condenser 34 is additively applied across the insulation 28 between the movable contact $C^4$ and the second stationary contact $C^5$, energization of the neon light $44^2$ will indicate leakage across the insulation 28 and across the normally open contacts $C^4$, $C^5$ of the relay 25. Due to leakage losses the D–C voltage applied across the insulation 28 is about 250 volts D–C.

For the type or relays 25 given in the example above, the charging condenser 34 may be of the electrolytic type with a rating of about 20 microfarads at about 150 volts. The resistor 36 may have a rating of about 510 ohms with about 1 watt dissipation and the first rectifier 38 and second rectifier 42 may be of silicon rectifier type with a rating of about 750 milliamperes and a peak inverse voltage of about 800 volts.

The neon lights $44^1$, etc., are a neon-indicating lamps of the type manufactured by General Electric as NE51H and the resistors $46^1$, $46^2$, etc., are about 100,000 ohms with about $\frac{1}{10}$ watt dissipation.

Although it is not essential a filter condenser 43, having a rating of about 8 microfarads at 250 volts, may be disposed in parallel by a return line 40c with contacts $C^3$, $C^4$, $C^5$, etc., for the purpose of smoothing the D–C voltage flowing in the above-described contact leakage circuit.

*Electrical continuity through the normally closed contacts of the relay*

As shown in FIGURE 3, the apparatus 20 is provided with a second signal means, suitably an indicator or a neon bulb $44^1$ connected through a resistor $46^1$ to the first stationary contact $C^3$ and by a return line 40a to the A–C voltage supply so that when the rectified first predetermined voltage from the A–C voltage supply and the second predetermined voltage from the charging condenser 34 are applied through the movable contact $C^4$ and the first stationary contact $C^3$, energization of the neon bulb $46^1$ indicates electrical continuity through the normally closed contacts $C^4$, $C^3$ of the relay 25.

*Electrical continuity of the relay coil and armature operation*

Referring again to FIGURE 3, the relay 25 has a coil 48 and an armature 50 pivoted at 52, the armature 50 being operable by the coil 48 to move the movable contacts $C^4$, $C^7$, $C^{10}$, $C^{13}$ into engagement with the corresponding second stationary contacts $C^5$, $C^8$, $C^{11}$, $C^{14}$ respectively. This coil 48 is connected by terminals $T^1$, $T^2$ and socket terminals $S^1$, $S^2$ to a power line 30a and a return line 40b to the A–C voltage supply. From a junction 54 with the power line 30 the power line 30a extends through a resistor 56, a third rectifier 58 and a normally open switch 60 to the socket terminal $S^1$, the switch 60 being in series with the A–C voltage supply and the coil 48 and being operable to energize the coil 48 upon closure of the switch 60, thereby actuating the armature 50 and causing the armature 50 to move the movable contact $C^4$ into engagement with the second stationary contact $C^5$, thus energizing neon light $44^2$ and indicating electrical continuity through the coil 48 and satisfactory operation of the armature 50.

In the example given, the resistor 56 may, for example, have a rating of about 2500 ohms and about 10 watt dissipation. The rectifier 58 may be of the selenium rectifier type with a rating of about 100 milliamperes and a peak inverse voltage of about 150 volts. The switch 60 may be of the single-pole, single-throw type.

For the purpose of smoothing the D–C voltage applied to the coil 48 of relay 25, a filter condenser 62 is disposed in parallel with the coil 48 by means of a return line 40c'. This filter condenser 62 may have a rating of about 20 microfarads at about 150 volts.

*Electrical continuity through the normally open contacts when the normally open contacts are in the closed position*

Referring again to FIGURE 3, with the switch 60 in the closed position, the additive application of the rectified first predetermined voltage from the A-C voltage supply and the second predetermined voltage from the charging condenser 34 through the movable contact $C^4$ and the second stationary contact $C^5$ while they are in the closed position causes energization of the neon bulb $42^2$, thus indicating electrical continuity through the normally open contacts $C^4$, $C^5$ of the relay 25 when these normally open contacts $C^4$, $C^5$ are in the closed position.

*Leakage across the normally closed contacts when the normally closed contacts are in the open position*

Again referring to FIGURE 3, the additive application of the rectified first predetermined voltage from the A-C voltage supply and the second predetermined voltage from the charging condenser 34 (while the switch 60 is in the closed position) across the insulation 28 between the movable contact $C^4$ and the first stationary contact $C^3$ causes energization of the neon light $44^1$, thus indicating leakage across the insulation 28 and across the normally closed contacts $C^4$, $C^3$ of the relay 25 when such normally closed contacts $C^4$, $C^3$ are in the open position.

As shown in FIGURE 1, the switch 60 is conveniently mounted above the relay socket 24 on the frame 22 and observation holes 64 are provided in the frame 22 above the neon lights $44^1$, $44^2$, etc.

ALTERNATIVE EMBODIMENTS

It will be understood by those skilled in the art that alternatively, as shown in FIGURE 4, the power line 30 may be connected directly to the stationary contact socket pins $S^3$, $S^5$, $S^6$, $S^8$, etc., and the movable contact socket pins $S^4$, $S^7$, $S^{10}$, etc., connected to a resistor $46^1$, etc., and the neon light $44^1$, etc.

SUMMARY OF THE ACHIEVEMENT OF THE OBJECTS OF THE INVENTION

It will be recognized by those skilled in the art that the objects of the present invention have been achieved by providing a relay test apparatus 20 which quickly, cheaply and conclusively tests the electrical continuity of the coil 48 of the relay 25; the operation of the armature 50 of the relay 25; leakage through any of the normally open contacts $C^4$, $C^5$, etc., of the relay 25 when such contacts $C^4$, $C^5$ etc. are in the open position; leakage through any of the normally closed contacts $C^4$, $C^3$, etc., of the relay 25 when such normally closed contacts $C^4$, $C^3$, etc., are in the open position; electrical continuity through the normally closed contacts $C^4$, $C^3$, etc., of the relay 25 when they are in the closed position and electrical continuity through the normally open contacts $C^4$, $C^5$, etc., of the relay 25 when they are in the closed position.

I claim:

1. Apparatus for testing a relay having a contact pile including a first stationary contact, a second stationary contact, a movable contact normally engageable with said first stationary contact and insulation between said first stationary contact, said second stationary contact and said movable contact, said appartus comprising:

(a) power means adapted to provide a first predetermined voltage;
(b) a storage capacitor connected to said power means;
(c) charging means connected to said power means and said storage capacitor for charging said storage capacitor to a second predetermined voltage;
(d) one of said movable contact and said second stationary contact being connected to said charged storage capacitor and said power means;
(e) a first signal means connected to the other of said movable contact and said second stationary contact and to said power means so that when said first predetermined voltage and said second predetermined voltage are additively applied across said insulation between said movable contact and said second stationary contact energization of said first signal means will indicate leakage across said insulation and across the normally open contacts of said relay;
(f) said relay also having a coil and an armature operable by said coil to move said movable contact into engagement with said second stationary contact;
(g) said coil being connected to said power means; and
(h) switch means in series with said power means and said coil and operable to energize said coil, actuate said armature and move said movable contact into engagement with said second stationary contact so that energization of said first signal means will indicate electrical continuity of said coil and operation of said armature.

2. The apparatus recited in claim 1 wherein the additive application of said first predetermined voltage and said second predetermined voltage through said movable contact and said second stationary contact cause energization of said first signal means thus indicating electrical continuity through the normally open contacts of said relay when said normally open contacts are in the closed position.

3. The apparatus recited in claim 1 having a second signal means connected to said first stationary contact and to said power means and wherein the additive application of said first predetermined voltage and said second predetermined voltage across said insulation between said movable contact and said first stationary contact causes energization of said second signal means thus indicating leakage across said insulation and across the normally closed contacts of said relay when said normally closed contacts are in the open position.

4. The apparatus recited in claim 1 wherein said charging means comprises a first rectifier and a first resistor.

5. The apparatus recited in claim 1 and having a second rectifier in series with said one of said movable contact and said second stationary contact and said charged capacitor.

6. The apparatus recited in claim 1 and having a second resistor in series with said first signal means and said other of said movable contact and said second stationary contact.

7. The apparatus recited in claim 1 wherein said one of said movable contact and said second stationary contact is said movable contact and having a second signal means connected to said first stationary contact and to said power means so that when said first predetermined voltage and said second predetermined voltage are applied through said movable contact and said first stationary contact energization of said second signal means indicates electrical continuity through the normally closed contacts of said relay.

References Cited

UNITED STATES PATENTS 3,217,244  11/1965  Glover _____ 324—54 XR

RUDOLPH V. ROLINEC, *Primary Examiner.*

E. L. STOLARUN, *Assistant Examiner.*

U.S. Cl. X.R.

324—51, 54